INVENTOR.
HERMANN G. GRIMMEISS
BY Frank R. Trifari
AGENT

INVENTOR.
HERMANN G. GRIMMEISS
BY
Frank R. Trifari
AGENT

INVENTOR.
HERMANN G. GRIMMEISS
BY
Frank R. Trifari
AGENT

INVENTOR.
HERMANN G. GRIMMEISS
BY
AGENT

United States Patent Office 3,430,050
Patented Feb. 25, 1969

3,430,050

JUNCTION PHOTOCELL HAVING INTERMEDIATE LEVEL AND AUXILIARY LIGHT SOURCE TO EXCITE INTERMEDIATE LEVEL

Hermann Georg Grimmeiss, Aachen, Germany, assignor to North American Philips Company Inc., New York, N.Y., a corporation of Delaware Filed Feb. 15, 1965, Ser. No. 432,457
U.S. Cl. 250—211 7 Claims
Int. Cl. H01l *15/06;* H01j *39/12*

The invention relates to an opto-electronic circuit element comprising a constructural combination of a photo-sensitive semiconductor body connected to the electric output of the circuit element and a radiation source which is optically coupled to said semiconductor body and is connected to the electric input of the circuit element.

Known devices of this kind in many cases have a radiation source in the form of an injection recombination radiation source, both the semiconductor body of this injection recombination radiation source and the photo-sensitive semiconductor body forming part of a common semiconductor body. Frequently the photosensitive semiconductor body contains a p-n junction and the opto-electronic circuit element has a structure similar to that of a transistor and hence is referred to as "opto-electronic transistor." An opto-electronic transistor has a radiating p-n junction which is biased in the forward direction and a collecting photo-sensitive p-n junction which is arranged to be biased in the reverse direction.

An advantage of these devices is that the thickness of the semiconductor layer between the two p-n junctions (base region) is not very critical since in this region no diffusing minority carriers but photons which travel at the speed of light are concerned.

An electric input signal is applied to the radiation source, converted by this source into an optical signal and applied to the photo-sensitive semiconductor body, where the optical signal is again converted into an electric output signal.

In known opto-electronic transistors recombination radiation is frequently obtained in the injection recombination radiation source by recombination of electrons with holes by way of an intermediate level present in the forbidden band. Generally only one of the transition steps involved, namely the steps from conduction band to intermediate level and from intermediate level to valence band, is a radiating step. In this case the quantum energy of the recombination radiation is smaller than the width of the forbidden band and there is little self-absorption in the semiconductor material between the area at which the radiation is produced by recombination and the photo-sensitive semiconductor body. In this material the intermediate level may be absent or may at least be present in a lesser degree owing to the substantial absence of the impurity which gives rise to the intermediate level.

Opto-electronic transistors are known in which the photo-sensitive semiconductor body consists of the same semiconductor material as the injection recombination radiation source or of a semiconductor material which has a greater width of the forbidden band than the semiconductor material of the radiation source. In these cases the photo-sensitive semiconductor body must have an intermediate level in the forbidden band to permit the generation of electron-hole pairs in two transition steps by way of the intermediate level. Although in some cases one of the transition steps may be produced by thermal energy, in many cases both transition steps have to be produced by optical agency. This means that in order to create an electron-hole pair two radiation quanta are required which both have to be supplied by the radiation source to which the input signals are applied.

Generally the intermediate level is not situated in the middle of the forbidden band and hence the two transition steps are different in size, while the recombination radiation mainly corresponds only to or is slightly greater than the energy required for the larger transition step, which energy frequently materially exceeds the energy required for the smaller tansition step. The latter property in many cases renders the occurrence of the smaller transition step comparatively improbable so that the efficiency of the process of generating electron-hole pairs is adversely affected.

For the photo-sensitive semiconductor body a semiconductor material has already been proposed in which the width of the forbidden band is at most equal to the energy corresponding to at least a material part of the recombination radiation. In this case the creation of an electron-hole pair in the photo-sensitive semiconductor body in principle requires only one radiation quantum supplied by the controlled radiation source, since band-to-band transitions are possible, however, the choice of the material is restricted to predetermined semiconductor materials.

It is an object of the present invention to provide a completely new type of opto-electronic circuit elements which provides wider possibilities of circuitry and moreover in many cases provides further important advantages over known opto-electronic circuit elements.

An opto-electronic circuit element comprising a constructural combination of a photo-sensitive semiconductor body to which the electric output of the circuit element is connected and a radiation source which is coupled to this semiconductor body and to which the electric input of the circuit element is connected, according to the invention is characterized in that the constructural combination comprises a second radiation source to which a second electric input is connected and by means of which the optical effect of the first radiation source on the photo-sensitive semiconductor body can be optically influenced. The radiation sources preferably are injection recombination radiation sources. The photo-sensitive semiconductor body may advantageously contain a p-n junction and be irradiated in the proximity of this p-n junction by at least one of the radiation sources.

It will be appreciated that one of the consequences of the second electric input is a wider choice of circuit arrangements for the opto-electronic circuit element. For example, one of the radiation sources may be fed with a current by which a photo-effect is produced in the photo-sensitive semiconductor body, which photo-effect may take the form of a photo-current and/or a photo-voltage and may be modulated by means of an electric input signal which, separate from the feeding current, is applied to the second radiation source through the second electric input. Moreover, mixing of input signals may be obtained by applying electric signals to both radiation sources.

The said optical influencing may be effected, for example, by optically coupling both radiation sources to the photo-sensitive semiconductor body, the optical effect of the radiation of one of the radiation sources on the photo-sensitive semiconductor body being stimulated by the radiation of the other radiation source.

An important embodiment of an opto-electronic circuit element according to the invention is characterized in that both radiation sources are optically coupled to the photo-sensitive semiconductor body which has a forbidden band in which an intermediate energy level is present resulting in that electrons can be brought from the valence band to the conduction band by optical agency in two transition steps by way of the intermediate energy level, one of the radiation sources emitting radiation a material part of which is capable only of producing the smaller transition step and the other radiation source emitting radiation a material part of which is capable of producing the larger transition step.

In this connection the following should be noted.

If one of the radiation sources is regarded as an auxiliary radiation source and a feeding current only is supplied to this radiation source whereas the electric input signals are applied to the other radiation source, the creation of an electron-hole pair in the photo-sensitive semiconductor body in principle requires only one radiation quantum from the latter controlled radiation source to produce one of the transition steps, since the second quantum required to produce the second radiation step can be supplied by the auxiliary radiation source. This is unlike the afore-mentioned known opto-electronic circuit elements of the kind in which electron-hole pairs are created in the photo-sensitive semiconductor body by way of an intermediate level and in which the creation of each electron-hole pair requires two radiation quanta from the radiation source to which the input signals are supplied. In addition, the invention provides a simple further control possibility because the magnitude of the supply current fed to the auxiliary radiation source is adjustable at will.

Furthermore there is produced radiation which mainly corresponds to energies sufficient to cause the larger transition step and radiation capable only of causing the smaller transition step, so that the probability of the creation of electron-hole pairs generally is greater than in the cases of known opto-electronic transistors in which for the creation of electron-hole pairs by way of an intermediate level in the forbidden band of the photo-sensitive semiconductor body there is only radiation which corresponds to energies which are at least equal to the energy required for the larger transition step. In experiments made in connection with the invention the following has been found, particularly in a photo-sensitive semiconductor body made of gallium-phosphide doped with zinc and oxygen. The photo-conduction or, if there is a p-n junction in the photo-sensitive semiconductor body, the photo-voltage and/or the photo-current produced in the photo-sensitive semiconductor body by irradiation with radiation capable of causing the larger transition step and hence in principle the smaller transition step also, increases considerably if the photo-sensitive semiconductor body is also radiated with radiation capable only of causing the smaller transition step. In a photo-sensitive semiconductor body of gallium phosphide doped with zinc and oxygen an increase by a factor of approximately 3 has been obtained and hence a photo-sensitive semiconductor body of gallium phosphide which, at least at the area at which the radiation is mainly absorbed, is doped with zinc and oxygen may advantageously be used. A photo-sensitive semiconductor body of aluminum phosphide may also be used to advantage.

Moreover, especially if electric input signals are applied to the radiation source which emits radiation capable only of causing the smaller transition step, in the photo-sensitive semiconductor body a photo-effect is controlled by means of radiation the quantum energy of which is considerably smaller than the width of the forbidden band in the photo-sensitive semiconductor body. This is particularly in contrast with the known aforementioned opto-electronic transistors in which in the photo-sensitive semiconductor body electron-hole pairs are created by band-to-band transitions and in which the quantum energy of the radiation influenced by control signals must at least be equal to the width of the forbidden band. The use of radiation quanta which are energetically small with respect to the width of the forbidden band in the photo-sensitive semiconductor body allows a larger energy gain.

In general it may be stated that an opto-electronic circuit element according to the invention enables control signals to be converted into energetically small radiation quanta and controlling by means of these small radiation quanta a photo-effect in a photo-sensitive semiconductor body having a greater band spacing, that is to say, a band spacing materially greater than corresponding to the energy of said radiation quanta. Of the resulting advantages the following two are important. Firstly, from the point of view of energy the control signals may advantageously be converted into radiation, since only energetically small radiation quanta are required, while secondly nevertheless large output powers can be derived since the photo-sensitive semiconductor body may have a larger width of the forbidden band, for in a photo-sensitive semiconductor body one of the factors which determine the value of the power to be derived is the width of the forbidden band of the photo-sensitive semiconductor body. These advantages may be utilized in a particularly full degree in a preferred embodiment of an opto-electronic circuit element according to the invention, which is characterized in that at least one of the radiation sources, which is destined to receive input signals, is an injection recombination radiation source comprising a semiconductor body in which the width of the forbidden band is smaller than that in the photo-sensitive semiconductor body.

The use of two kinds of radiation may permit a wider choice of the materials to be used for the photo-sensitive semi-conductor body. Thus, for example, a semiconductor material which owing to an impurity present has an intermediate level in the forbidden band may be little suited for a photo-effect to be produced in it by bringing electrons in two steps from the valence band to the conduction band by way of the intermediate level solely by means of radiation capable of giving rise to the larger transition step while this material may yet be very suitable for producing a photo-effect in the afore-described manner with the aid of two kinds of radiation.

The intermediate energy level is preferably spaced by a distance at least equal to 0.1 electron-volt both from the valence band and from the conduction band. This prevents the occurrence of inconvenient thermal transitions of electrons from the valence band to the intermediate level or from the intermediate level to the conduction band at room temperature.

When the photo-sensitive semiconductor body consists of gallium phosphide which, at least locally, is doped with zinc and oxygen, the radiation source which emits the radiation capable of causing the larger transition step may advantageously be an injection recombination radiation source comprising a semiconductor body which includes a p-n junction and consists of gallium phosphide which, at least in the proximity of the p-n junction, is doped with zinc and oxygen. The radiation source which emits radiation of which a material part is capable only of causing the smaller transition step may advantageously be an injection recombination radiation source comprising a semiconductor body of gallium arsenide or indium phosphide. It should be noted that the expression "in the proximity of the p-n junction" is to be understood to include "at least on one side of the p-n junction."

If both radiation sources are optically coupled to the photo-sensitive semiconductor body, the optical effect used in the photo-sensitive semiconductor body by one of the radiation sources may be influenced by the other radiation source in a manner such that it is reduced. In this connection we have in mind the reduction (quenching) of photo-conduction. Hence a further important embodiment of an opto-electronic circuit element according to the invention is characterized in that the two radiation sources are optically coupled to the photo-sensitive semiconductor body, one of the radiation sources emitting radiation of which a material part is capable of generating free charge carriers in the photo-sensitive semiconductor body, while the other radiation source emits radiation of which a material part is capable of reducing the lifetime of free charge carriers in the photo-sensitive semiconductor body.

The photo-sensitive semiconductor body preferably includes a p-n junction and consists, at least on one side of the p-n junction, of a semiconductor material in which by one radiation source free charge carriers, including minority carriers, may be generated, while the lifetime of the free minority carriers present in the semiconductor material may be reduced by means of radiation having a larger wavelength than the radiation generating the free charge carriers, the other radiation source emitting radiation consisting, a least for a material part, of radiation capable of reducing the lifetime of free minority carriers.

Reduction of a photo-current produced in a semiconductor body which includes a p-n junction by means of radiation has not previously been established. The invention is based inter alia on the recognition of the fact that in many semiconductor materials in which photo-conduction can be reduced by means of radiation the lifetime of the free minority carriers is not reduced by this reduction of the photo-conduction. However, the photo-current produced in a semiconductor body which includes a p-n junction is largely dependent upon the lifetime of the free minority carriers, and to reduce a photo-current in a semiconductor body which includes a p-n junction a semiconductor material must be used in which the lifetime of free minority carriers can be reduced by means of radiation.

A successful embodiment is characterized in that the photo-sensitive semiconductor body consists of gallium phosphide, while at least in the p-type part of the photo-sensitive semiconductor body adjacent the p-n junction free charge carriers including minority carriers (electrons) can be generated by one source of radiation, this p-type part containing an acceptor level obtained by doping with copper and being irradiated by the other radiation source with radiation which at least for a material part consists of radiation having a quantum energy which is at least equal to the spacing between the acceptor level and the valence band, which spacing is about 0.57 electron-volt. In this embodiment the photo-current produced by means of one radiation source can be reduced to one thousandth part of its initial value by irradiation by the other radiation source, while a high sensitivity has been found.

The reduction in the lifetime of the electrons (minority carriers) in the p-type part of the gallium phosphide body would appear to have the following explanation. The life time of the electrons generated by one source of radiation is determined by recombination of electrons with holes by way of band-to-band transitions or by way of recombination centres (killers) incorporated during manufacture. Recombination is also possible by way of the acceptor level produced by copper, however, transitions by way of this acceptor level are slow so that this acceptor level has substantially no influence upon the recombination. The Fermi level lies between the copper level and the valence band so that the acceptor level, at least partly, contains no electrons and electrons can be brought from the valence band into this acceptor level by the other radiation source. However, this increases the concentration of holes in the valence band, which promotes the recombination of electrons with holes and reduces the lifetime of the free electrons.

Semiconductor materials other than the aforementioned copper-doped gallium phosphide may be used in which phenomena of this kind will occur.

An important embodiment of a circuit element according to the invention, which is based on the afore-mentioned phenomena, consequently is characterized in that the p-type part of the photo-sensitive semiconductor body adjacent the p-n junction consists of a semiconductor material in which by means of one radiation source free charge carriers including minority carriers can be generated, the lifetime of the minority carriers depending upon recombination of electrons with holes, while the semiconductor material further contains an acceptor level which has substantially no influence on this recombination, the Fermi level lying between this acceptor level and the valence band, while the radiation emitted by the other radiation source, consists, at least for a material part, of radiation capable of bringing electrons from the valence band to the acceptor level, which results in an increase in the concentration of holes in the valence band, which again promotes the recombination of electrons with holes and reduces the lifetime of the minority carriers (electrons).

It should be noted that semiconductor materials may be used in which the lifetime of minority carriers can be reduced by incident radiation and in which phenomena other than the afore-mentioned phenomena are of significant importance.

If the photo-sensitive semiconductor body consists of gallium phosphide of which the p-type part is doped with copper, one radiation source, which emits radiation of which a material part is capable of generating free charge carriers in the photo-sensitive semiconductor body, may advantageously be an injection recombination radiation source which comprises a semiconductor body of gallium phosphide which includes a p-n junction and is doped with zinc at least in the proximity of the p-n junction. The other radiation source, which emits radiation of which a material part is capable of reducing the lifetime of free minority carriers in the photo-sensitive copper-doped gallium phosphide body, may advantageously be an injection recombination radiation source comprising a semiconductor body of gallium arsenide or indium phosphide or a semiconductor body consisting of gallium phosphide which, at least in the proximity of the p-n junction, is doped with zinc and oxygen.

In the latter embodiment substantially the same advantages as have been described with reference to the former embodiments are also found. It should be noted that a positive input signal applied to the other radiation source, which is capable of reducing the photo-effect obtained by means of the one radiation source, results in a negative output signal.

In this case also the radiation source to which input signals are applied preferably is an injection recombination radiation source comprising a semiconductor body in which the width of the forbidden band is smaller than in the photo-sensitive semiconductor body.

The optical effect obtained in the photo-sensitive semiconductor body by means of a radiation source which is optically coupled to this body may be controlled by a second radiation source in a manner totally different from that discussed so far. By means of the second radiation source the intensity of the radiation emitted by the radiation source optically coupled to the photo-sensitive semiconductor body may be controlled before this radiation reached the photo-sensitive semiconductor body. A first possibility consists, for example, in that the radiation source which is optically coupled to the photo-sensitive semiconductor body is an injection recombination radiation source, the second radiation source being optically coupled to this injection recombination radiation source and emitting radiation which is capable of either stimulating or inhibiting the recombination of electrons and holes in the injection recombination radiation source, which recombination causes the emission of radiation. This possibility is extensively discussed in co-pending application Ser. No. 434,787, filed Feb. 24, 1965.

Another possibility is used in an embodiment of the opto-electronic circuit element according to the invention which is characterized in that there is interposed between the radiation source optically coupled to the photo-sensitive semiconductor body and this photo-sensitive semiconductor body a filter of semiconductor material the transmission of which for radiation of this radiation source can be optically controlled by means of the second radiation source optically coupled to this filter. If in this filter electrons can be brought by optical agency from the valence band to the conduction band in two transition steps while the quantum energy of the radiation of the radiation source optically coupled to the photo-sensitive semiconductor body mainly corresponds to the energy required for one of the transition steps, for example, the absorption of this radiation may be increased and hence the transmission of this radiation may be reduced by irradiating the filter with radiation the quantum energy mainly corresponds to the energy required for the other transition step. In this manner the photo-conduction both in the filter and in the photo-sensitive semiconductor body is controllable, a maximum photo-conduction in the photo-sensitive semiconductor body entailing a minimum photo-conduction in the filter, and conversely. If the filter and the photo-sensitive semiconductor body are both provided with connecting contacts in principle a circuit element is available which has not only two electric inputs but also two electric outputs.

At least two of the components of a circuit element according to the invention, which components are constituted by the radiation sources and the photo-sensitive semiconductor body and, as the case may be, a filter, preferably have a common semiconductor body. This permits of a very compact construction.

In order that the invention may readily be carried into effect, embodiments thereof will now be described, by way of example, with reference to the accompanying diagrammatic drawings, in which.

Figure 1:
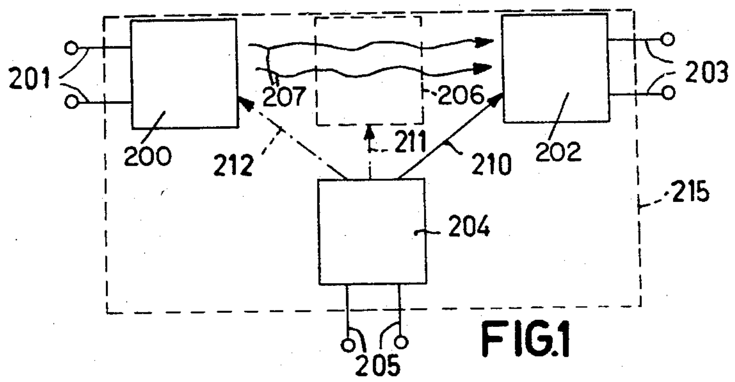
FIG. 1 is a schematic circuit diagram of the basic elements of an opto-electronic circuit element.

FIG. 1 is a schematic circuit diagram showing the basic components of an opto-electronic circuit element according to the invention, which comprises an integral structure including a photo-sensitive semiconductor body 202, which is connected to an electric output 203 of the circuit element, and a radiation source 200, which is optically coupled to said photo-sensitive semiconductor body and is connected to an electric input 201 of the circuit element. The radiation source 200 emits radiation 207 which strikes the photo-sensitive semiconductor body 202. According to the invention the integral structure further includes a second radiation source 204, which is connected to a second electric input 205 and by means of which the optical effect of the radiation source 200 on the photo-sensitive semiconductor body 202 can be optically influenced. The integral structure may be arranged in an envelope which is indicated by a broken line 215.

The said optical influencing may be effected (1) By reason of the fact that the radiation source 204 also is optically coupled to the photo-sensitive semiconductor body 202, the radiation source 204 emitting radiation 210 which may argument or weaken the effect of the radiation 207 on the photo-sensitive semiconductor body;

(2) By the provision of a filter 206, the radiation source 204 being optically coupled to this filter 206 and emitting radiation 211 which influences the transmission of the filter 206 for the radiation 207;

(3) By reason of the fact that the radiation source 200 is an injection recombination radiation source, the radiation source 204 being optically coupled to the semiconductor body of the radiation source 200 and emitting radiation 212 which is capable of either stimulating or inhibiting the recombination of electrons with holes, which recombination is accompanied by emission of radiation in the semiconductor body of the radiation source 200.

The last-mentioned possibility is extensively discussed in the said co-pending application Ser. No. 434,787.

There will now be described embodiments which relate to the possibility sub (1), which will be followed by embodiments relating to the possibility sub (2).

Figures 2, 3, 4:
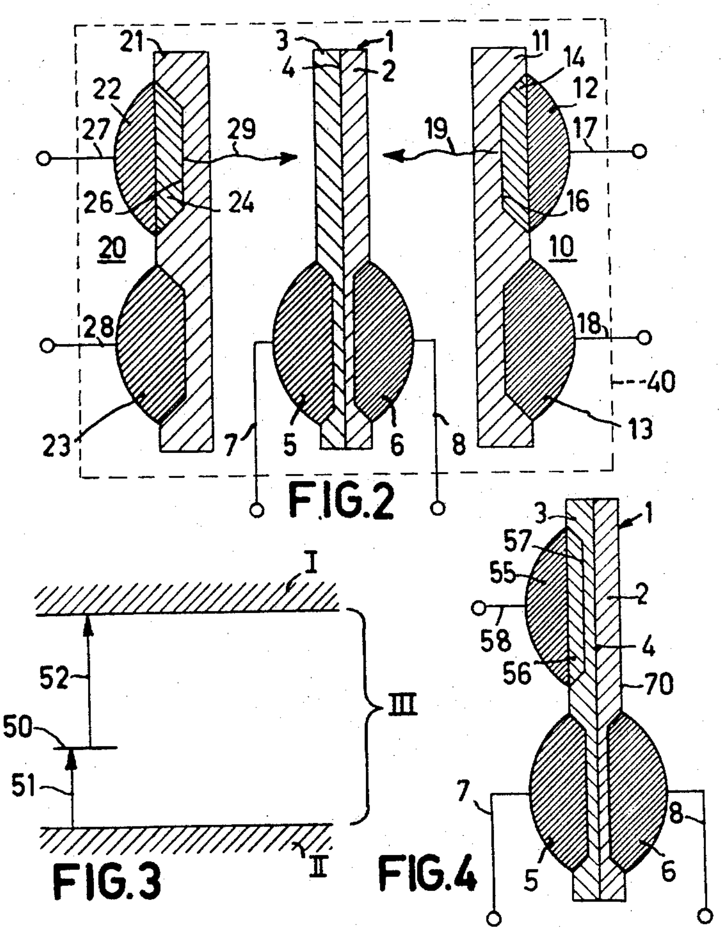
FIG. 2 is a schematic cross-sectional view of an embodiment of an opto-electronic circuit element according to the invention.
FIG. 3 is an energy diagram of a photo-sensitive semiconductor body used in an embodiment of an opto-electronic circuit element according to the invention.
FIG. 4 is a schematic cross-sectional view of part of a further embodiment of an opto-electronic circuit element according to the invention.

The opto-electronic circuit element of FIG. 2 comprises a constructural combination of a photo-sensitive semiconductor body 1, which is connected to the electric output constituted by conductors 7 and 8, and a radiation source 10, which is optically coupled to this semiconductor body and is connected to the electric input constituted by conductors 17 and 18. The combination includes a second radiation source 20, which is also optically coupled to the photo-sensitive semiconductor body 1 and is connected to a second electric input constituted by conductors 27 and 28, while the optical effect of the radiation source 10 on the photo-sensitive semiconductor body 1 can be optically influenced by means of this radiation source 20.

The constructural combination including the radiation sources 10 and 20 and the photo-sensitive semiconductor body 1 may be arranged in an envelope which is schematically shown by a broken line 40.

The radiation sources 10 and 20 may be tungsten ribbon lamps each provided with a monochromator for example an interference filter, to supply the desired radiation. Such filters are readily obtainable commercially. However, the radiation sources 10 and 20 preferably are injection recombination radiation sources, and such sources are shown in FIG. 2.

The two radiation sources 10 and 20 are optically coupled to the photo-sensitive semiconductor body 1, which has a forbidden band III in which an intermediate energy level 50 (FIG. 3) is present so that electrons can be brought by optical agency from the valence band II to the conduction band I in two transition steps (represented in FIG. 3 by arrows 51 and 52) by way of the intermediate energy level 50. The radiation source 10 emits radiation 19 of which a material part is capable of producing only the smaller transition step 51, that is to say, the quatum energy of the radiation 19 is at least equal to the energy corresponding to the spacing between the intermediate energy level 50 and the valence band II and is smaller than the energy corresponding to the spacing between the intermediate energy level 50 and the conduction band I. The radiation source 20 emits radiation 29 a material part of which is capable of causing the larger transition step 52, that is to say, the quantum energy of the radiation 29 is about equal to or greater than the energy corresponding to the spacing between the intermediate energy level 50 and the conduction band I but may be smaller than the energy corresponding to the width of the forbidden band III.

The photo-sensitive semiconductor body 1 may consist of gallium phosphide which, at least at the area at which the radiation 19 and 29 are mainly absorbed, is doped with zinc and oxygen, while preferably a p-n junction 4 is present, enabling the photo-sensitive semiconductor body 1 to be used as a photo-voltaic cell.

The p-n junction may be obtained in that into a wafer of gallium phosphite, which exhibits n-type conduction owing to an impurity in the form of oxygen, zinc is diffused from one side at a temperature of about 800° C. for about 1 hour. The size of the wafer may be, for example, about 3 mm. x 3 mm. x 0.5 mm. Thus the photo-sensitive semiconductor body includes an n-type zone 2 doped with oxygen and a p-type zone 3 doped with zinc and oxygen.

The width of the forbidden band in the photo-sensitive body 1 in this case is about 2.25 electron-volts and the distances by which the intermediate level 50, which is caused by the zinc and oxygen, is spaced from the valence band and the conduction band are about 0.45 electron-volt and 1.8 electron-volts, respectively.

A substantially ohmic connecting contact 6 may consist of an amount of tin which is fused to the semiconductor body at a temperature between 400° C. and 700° C. in a time of less than 1 second, while a substantially ohmic connecting contact 5 may consist of gold to which about 4% by weight of zinc is added and which also is fused to the semiconductor body at a temperature between 400° C. and 700° C. in a time of less than 1 second. The diameters of the contacts 5 and 6 are about 0.5 mm. The leads 7 and 8 may be provided in a manner known in the semiconductor art.

In the embodiment under consideration the injection recombination radiation source comprises a p-type gallium phosphide body 21 which is doped with zinc and oxygen. A connecting contact 22 is produced by fusing to this body an amount of tin under the same conditions as described with reference to the contact 6. Thus, an n-type recrystallized region 24 and a p-n junction 26 are obtained. A substantially ohmic connecting contact 23 is made from the same materials and in the same manner as the connecting contact 5.

If through leads 27 and 28 a current in the forward direction is passed through the p-n junction 26, in the proximity of the p-n junction 26 recombination radiation 29 having a quantum energy of about 1.8 electron-volts and a wavelength of about 7000 A.U. is produced by recombination of electrons and holes. Consequently, this radiation is capable of causing the larger transition step 52 (FIG. 3).

In the embodiment under consideration the injection recombination radiation source 10 comprises a semiconductor body 11 of gallium arsenide having a p-n junction 16 provided by fusing a connecting contact 12 onto this body. A substantially ohmic contact 13 is also produced by fusing. The gallium arsenide body 11 has a width of the forbidden band of about 1.36 electron-volts so that in this body 11 recombination radiation 19 can be produced which has a wavelength of about 9100 A.U. This radiation 19 is capable only of causing the smaller transition step 51.

The injection recombination radiation source 10 may be obtained, for example, by starting from an n-type gallium arsenide wafer of about the same size as the photo-sensitive semiconductor body 1 and by fusing onto it, at a temperature between 600° C. and 700° C., a rectifying contact consisting of indium which contains about 3% by weight of zinc, so that a p-type recrystallized region 14 and the p-n junction 16 are produced. The ohmic contact 13 may be provided by fusing an amount of tin onto the semiconductor body.

It has been found that the photo-effect which is produced in the photo-sensitive semi-conductor body 1 by the radiation 29 capable of causing the larger transition step 52 can be considerably enhanced, for example, by a factor of 3, by means of the radiation 19 capable of producing the smaller transition step 51. The photo-effect may be measured in the form of a short-circuit current between the leads 7 and 8.

Figure 5:
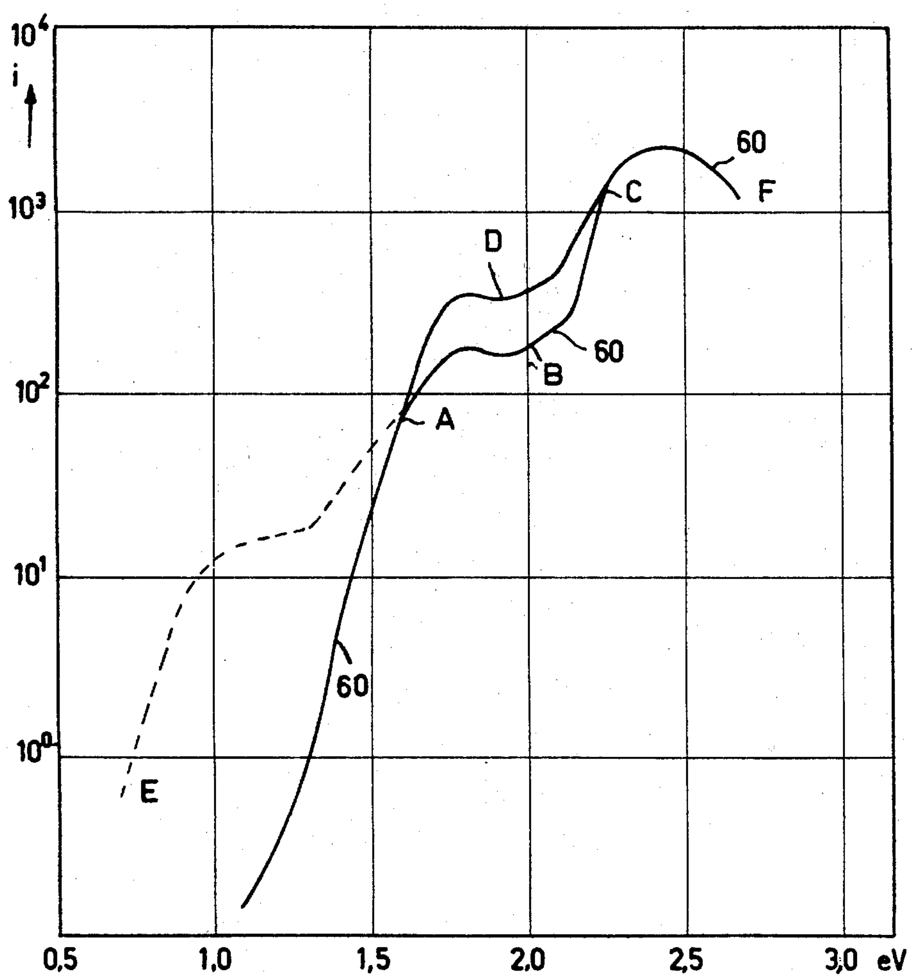
FIG. 5 is a graph showing the spectral sensitivity of a photo-sensitive semiconductor body of gallium phosphide doped with zinc and oxygen.

In FIG. 5 a short-circuit current $i$ between the leads 7 and 8 is plotted logarithmically (base 10) as a function of the wavelength (converted into electron-volt) of the radiation incident on the photo-sensitive semiconductor body 1. Curve 60 shows the spectral sensitivity of the photo-sensitive semiconductor body 1. If, however, the photo-sensitive semiconductor body is constantly irradiated with radiation which is capable only of producing the smaller transition step and by itself does not give rise to a short-circuit current, the spectral sensitivity is represented by curve 60 in which the portion ABC is replaced by a portion ADC. The spectral sensitivity to radiation which is capable of causing the larger transition step and the quantum energy of which is smaller than the width of the forbidden band, that is to say, radiation having a quantum energy between about 1.7 electron-volts and 2.25 electron-volts, has materially increased in this case.

The radiation capable only of producing the smaller transition step may have wavelengths which correspond to energies between about 0.5 electron-volt and about 1.7 electron-volts, preferably between about 0.6 electron-volt and about 1.5 electron-volts.

Conversely, if the photo-sensitive semiconductor body 1 is irradiated substantially continuously with radiation capable of causing the larger transition step, for example, with radiation having a wavelength of about 7000 A.U., which corresponds to about 1.8 electron-volts the spectral sensitivity is considerably extended, as is shown by curve EBF. In other words, the photo-sensitive semiconductor body in this case is sensitive also to radiation which is capable only of causing the smaller transition step and has wavelength which correspond to energies between about 0.5 electron-volt and about 1.7 electron-volts.

The above shows that the effect of the radiation 29 on the photo-sensitive semiconductor body 1 can be influenced by means of the radiation 19, and conversely.

FIG. 2 shows an opto-electronic circuit element which has two electric inputs (27, 28) and (17, 18) and one electric output (7, 8).

A supply current may be fed to the radiation source 20 through the electric input (27, 28) while entirely apart from this supply current input signals may be applied to the radiation source 10 through the electric input (17, 18). The output signal can be taken from the electric output 7, 8. Thus, the circuit element may be used, for example, as an amplifying element for electric signals.

An important feature consists in that the sensitivity of the photo-sensitive semiconductor body 1 to the radiation 19 is adjustable by controlling the supply current and hence the intensity of the radiation 29.

Moreover, for each electron-hole pair generated in the photo-sensitive semiconductor body in principle only one radiation quantum is required which is emitted by the radiation source to which the input signals are applied, since the second radiation quantum required is supplied by the other radiation source.

Since not only the radiation 29 capable of causing the larger transition step but also the radiation 19 capable only of causing the smaller transition step is present, the process becomes more efficient with respect to the generation of electron-hole pairs, as is also shown in FIG. 5. The sensitivity of radiation capable of causing the larger transition step (see the portion ABC of curve 60) increases on irradiation with radiation capable only of causing the smaller transition step (see curve ADC of FIG. 5).

If the input signals are applied to the gallium arsenide radiation source 10, these signals are converted into optical signals which consist of radiation having a quantum energy of about 1.36 electron-volts, which energy is considerably smaller than the width of the forbidden band (about 2.25 electron-volts) of the gallium phosphide body 1. As has been explained hereinbefore, this beneficially affects the energy gain of the opto-electronic circuit element shown in FIG. 2, because the input signals are converted into energetically small radiation quanta in an energetically advantageous manner while nevertheless large output powers are obtainable, since with respect to these radiation quanta the photo-sensitive semi-conductor body 1 has a large band spacing.

The use of two kinds of radiation generally permits a wider choice of materials for the photo-sensitive semiconductor body, particularly with respect to impurities which induce an intermediate level in the forbidden band, in comparison with cases in which only a single kind of radiation is used.

It should be noted that in the embodiment under consideration the input signals may alternatively be applied to the radiation source 20, a supply current being fed to the radiation source 10. Furthermore, input signals may be applied to both radiation sources 10 and 20 so that input signals can be mixed. Also, an opto-electronic circuit element as shown in FIG. 2 may be used for coincidence circuit arrangements. For this purpose an external circuit connected to the electric output (7, 8) may include a signal source which provides a signal only if the photo-current produced in the photo-sensitive semiconductor body 1 exceeds a threshold value. The photo-current obtainable by irradiation of the photo-sensitive semiconductor body 1 by one of the two radiation sources 10 and 20 must remain beneath this threshold value, whereas the photo-currents which can be produced in the photo-sensitive semiconductor body 1 by irradiation by the two radiation sources 10 and 20 together must exceed this threshold value. Only if input signals are simultaneously applied to both radiation sources 10 and 20 so that these radiation sources simultaneously irradiate the photo-sensitive semiconductor body 1, a signal is delivered by the signal source in this case. Instead of photo-currents photo-voltages may be used.

The semiconductor body 21 of the radiation source 20 need not consist of gallium phosphide but may also consist of other semiconductor materials in which the width of the forbidden band is smaller than in gallium phosphide but sufficient to generate radiation capable of causing the larger transition step in the photo-sensitive semiconductor body 1. The semiconductor body 11 of the radiation source 10 need not consist of gallium arsenide but may also consist of, for example, indium phosphide.

In FIG. 4 the photo-sensitive semiconductor body 1 provided with connecting contacts 5 and 6 as shown in FIG. 2 is again shown, provided with a further connecting contact 55 and an associated recrystallized n-type region 56 which forms a p-n junction 57 with the p-type zone 3. The contact 55 may be provided in a manner similar to that described hereinbefore with reference to the contact 22 of FIG. 2. By biasing the p-n junction 57 in the forward direction radiation is obtainable having the same wavelength as the radiation 29 emitted by the radiation source 20. Consequently the photo-sensitive semiconductor body 1 provided with contacts and the radiation source 20 of FIG. 2 may be replaced by the structure of FIG. 4, in which a radiation source and the photo-sensitive semiconductor body have a common semiconductor body. The electric input (27, 28) of FIG. 2 is replaced by an electric input (58, 7) in FIG. 4.

The semiconductor bodies 11 and 21 (FIG. 2) of the radiation sources 10 and 20 and the photo-sensitive semiconductor body 1 preferably form part of a common semiconductor body, which permits of a very compact construction having a smaller number of connecting contacts. Such a structure is shown in FIG. 6.

This structure is simply obtainable by starting from a construction as shown in FIG. 4. The surface 70 of the n-type zone 2 of the photo-sensitive gallium phosphide body 1 is not provided with a contact 6 but is coated with a layer 71 (FIG. 6) of n-type gallium arsenide by a method commonly used in the semiconductor art, for example, by the deposition of semiconductor material from the gas phase. This n-type gallium arsenide layer makes substantially an ohmic contact to the n-type gallium phosphide layer 2 and replaces the n-type gallium arsenide body 11 of FIG. 2. Contacts 12 and 13 may be provided on the circuit element of FIG. 6 in a manner similar to that described with reference to FIG. 2. The electric inputs (17, 18) and (27, 28) and the electric output (7, 8) of FIG. 2 correspond to the electric inputs (58, 7) and (17, 18) respectively and to the electric output (7, 18) of FIG. 6.

Figure 6:
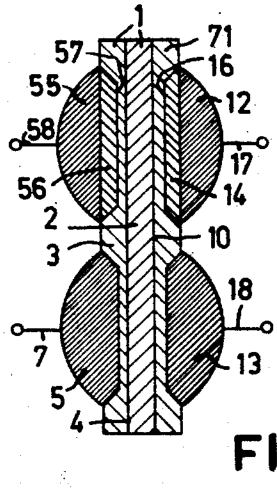
FIG. 6 shows an embodiment of an opto-electronic circuit element according to the invention comprising a single semiconductor body.

The opto-electronic circuit element shown in FIG. 6 comprises a gallium phosphide body 1, which includes two p-n junctions 4 and 57, and a gallium arsenide body 71, which is provided on the gallium phosphide body and includes a p-n junction 16. The p-n junctions 57 and 16 are obtained by a fusing process. They may, however, also be obtained by diffusion and/or epitaxial methods. The p-n junction 4 may also be obtained by an epitaxial method. In this case, the resulting semiconductor body need only be provided with substantially ohmic contacts.

The photo-sensitive semiconductor body may consist of a semiconductor material which contains an intermediate level in the forbidden band so that electrons can be brought in two transition steps from the valence band by way of the intermediate level to the conduction band by optical agency but is not gallium phosphide doped with zinc and oxygen. However, for operation of the opto-electronic circuit element at room temperature the intermediate level preferably is spaced by distances of at least 0.1 electron-volt both from the valence band and from the conduction band. Thus, there are substantially no inconvenient thermal transitions. A suitable material other than gallium phosphide is, for example, aluminum phosphide. Aluminum phosphide has a width of the forbidden band of about 2.42 electron-volts and in not intentionally doped crystals an intermediate level has been found which is spaced from the valence band by about 0.37 electron-volt.

An embodiment of an opto-electronic circuit element according to the invention will now be described (with reference to FIG. 7) in which both radiation sources (90 and 100) are optically coupled to the photo-sensitive semiconductor body 80, one radiation source 90 emitting radiation 91 of which a material part is capable of generating free charge carriers in the photo-sensitive semiconductor body 80, the other radiation source 100 emitting radiation 101 of which a material part is capable of reducing the lifetime of free charge carriers in the photo-sensitive semiconductor body 80.

The photo-sensitive semiconductor body 80 consists, at least on one side of a p-n junction 82, of a semiconductor material in which the radiation source 90 can generate free charge carriers including minority carriers, while the lifetime of free minority carriers present in the semiconductor material can be reduced by means of radiation having a larger wavelength than the radiation which emits the free charge carriers, the other radiation source 100 emitting radiation 101 which, at least for a material part, consists of radiation which reduces the life of free minority carriers.

In the embodiment under consideration the photo-sensitive semiconductor body 80 consists of gallium phosphide and in a p-type part 82 adjacent the p-n junction 82 free charge carriers including minority carriers (electrons) can be generated by the radiation source 90. The p-type part 81 contains an acceptor level which is produced by doping with copper and is spaced from the valence band by a distance of about 0.57 electron-volt. The radiation source 100 irradiates the p-type part 81 with radiation 101 the quantum energy of which is at least equal to the spacing between the acceptor level and the valence band.

Since the width of the forbidden band in gallium phosphide is about 2.25 electron-volts, the radiation 91 which has a wavelength of about 5600 A.U. can generate free charge carriers. If desired, the radiation 91 may have a considerably shorter wavelength, for example, a wavelength of about 4400 A.U.

The gallium phosphide body 80 has dimensions of, for example, about 3 mm. x 3 mm. x 0.2 mm. The doping with copper may be effected by diffusing copper into the gallium phosphide body 80 at a temperature between about 800° C. and 1000° C. The copper may previously have been provided on the surface of the gallium phosphide body by deposition from the vapour phase, if required, while heating the gallium phosphide body to a temperature between about 350° C. and 500° C.

A contact 84 may be obtained, for example, by fusing tin onto the semi-conductor body 80 at a temperature between about 400° C. and 700° C. for a time of preferably less than 1 second. This provides an n-type recrystallized region 83 and an associated p-n junction 82.

A substantially ohmic contact 85 is obtainable by fusing onto the body gold containing about 4% by weight of zinc, likewise at a temperature between about 400° C. and 700° C. for a time of preferably less than 1 second. This results in the p-type recrystallized region 86. The diameter of the contacts 84 and 85 is about 0.5 mm. and these contacts are provided with connecting leads 87 and 88 by a known method.

Figure 7:
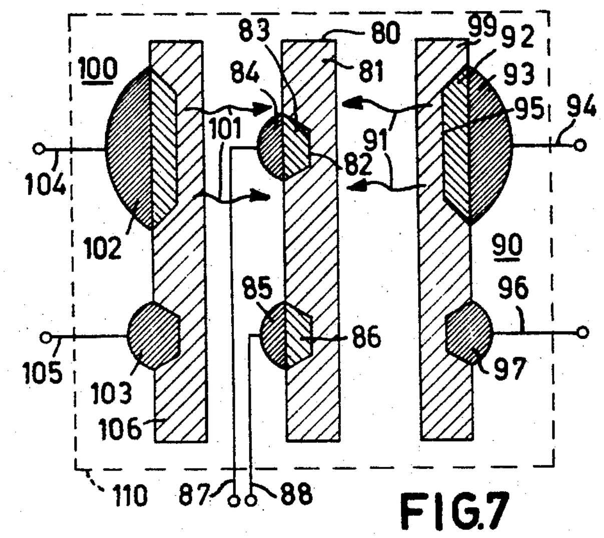
FIG. 7 is a schematic cross-sectional view of another embodiment of an opto-electronic circuit element according to the invention.

A photo-current produced in the photo-sensitive semiconductor body 80 may be derived, for example, in the form of a short-circuit current from leads 87 and 88, which form the electric output of the circuit element of FIG. 7.

Figure 8:
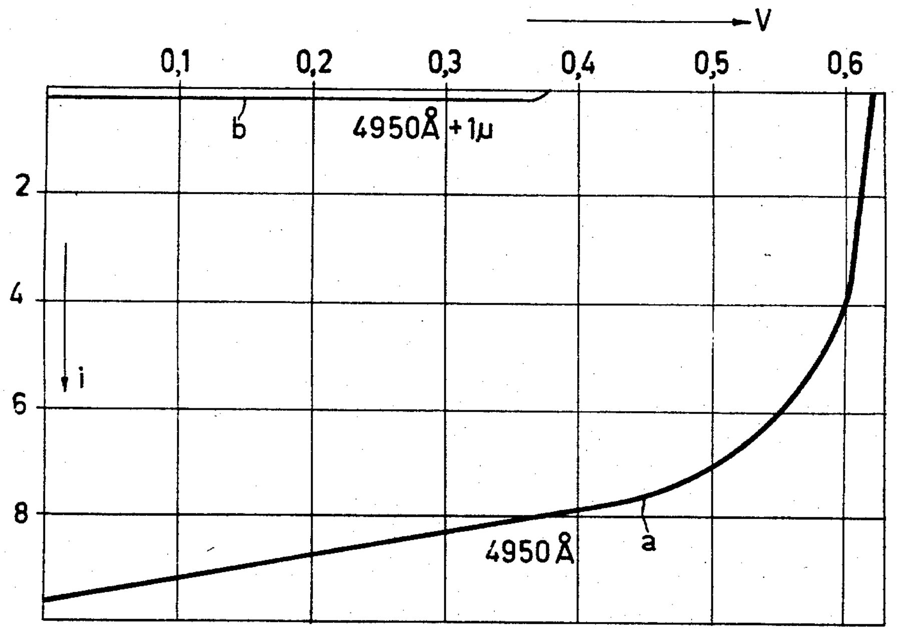
FIG. 8 shows two curves which represent the photo-current in a photo-sensitive semiconductor body used in the embodiment of FIG. 7 as a function of the voltage between the connecting contacts and which are obtained by irradiating the photo-sensitive semiconductor body with different kinds of radiation.

In FIG. 8 a curve *a* shows, in arbitrary units, the photocurrent *i* which is produced by irradiating the photosensitive semiconductor body 80 with radiation having a wavelength of about 4950 A.U., as a function of the electric voltage in volts set up between the contacts 84 and 85. If the photo-sensitive semiconductor body 80 is also irradiated with radiation having a wavelength of about 1$\mu$ (about 1.2 electron-volts), a curve *b* is obtained. These curves clearly show that the photo-current *i* is greatly reduced by the simultaneous irradiation with radiation having a wavelength of about 1$\mu$. Consequently the magnitude of the photo-effect obtained by means of radiation having a wavelength of about 4950 A.U. can be controlled by means of radiation having a wavelength of about 1$\mu$. It has been found that the radiation which reduces the photo-current must have a quantum energy between about 0.6 electron-volt and 2.0 electron-volts while the radiation which produces the photo-current to be reduced may have a wavelength of about 5600 A.U. or less.

The radiation source 90 is an injection recombination radiation source and in the embodiment shown in FIG. 7 comprises a gallium phosphide body 99 which, unlike the gallium phosphide body 21 of radiation source 20 (FIG. 2), is not doped with zinc and oxygen but only with zinc. A contact 93, an associated n-type recrystallized region 92 and a p-n junction 95 may be obtained in the same manner as the contact 22, the associated n-type recrystallized region 24 and the p-n junction 26, and the ohmic contact 97 may be provided in the same manner as the contact 23. The contact 93 has a diameter of about 1.5 mm. and the contact 97 a diameter of 0.5 mm. The radiation source 90 emits radiation 91 having a wavelength of about 5600 A.U.

Leads 94 and 96 form an electric input of the circuit element of FIG. 7, through which a supply current can be supplied to the radiation source 90.

The radiation source 100 may be an injection recombination radiation source which consists of the same materials as the radiation source 20 of FIG. 2 and is produced by similar methods. The diameters of contacts 102 and 103 are about 1.5 mm. and 0.5 mm., respectively. Consequently the radiation 101 corresponds to the radiation 29 of FIG. 2 and has a wavelength of about 7000 A.U. (about 1.8 electron-volts). Leads 104 and 105 form the second electric input of the circuit element, through which electric input signals may be applied to this element.

It should be noted that a positive input signal applied to the electric input (104, 105) produces a negative output signal at the electric output (87, 88).

An important possibility of controlling the operation of the circuit arrangement is provided by the possibility of controlling the supply current which is supplied to the radiation source 90 through the input (94, 96).

Furthermore the circuit element of FIG. 7 has similar advantages as the circuit element of FIG. 2.

The radiation sources 90 and 100 together with the photo-sensitive semiconductor body 80 preferably form an integral structure and may be enclosed in a common envelope, which is indicated by a broken line 110.

Figure 9:
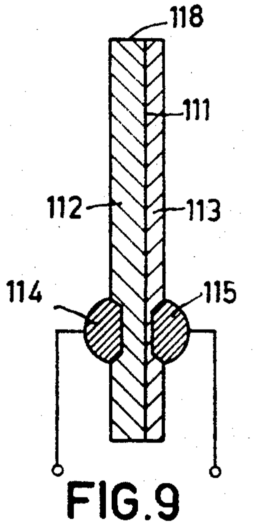
FIG. 9 is a schematic cross-sectional view of a photo-sensitive semiconductor body for use in the circuit element shown in FIG. 7.

The photo-sensitive gallium phosphide body 80 which contains a p-n junction 82 obtained by a fusing process may be replaced by a photo-sensitive gallium phosphide body 118 (FIG. 9) having a p-n junction 111 obtained by diffusion. A zone 112 has p-type conduction and is doped with copper while a zone 113 shows n-type conduction. The p-n junction 111 may be obtained by diffusion of copper into the initial n-type body 118 at a temperature between about 800° C. and 1000° C. A substantially ohmic contact 114 may be provided in the same manner as the contact 85 (FIG. 7) and a substantially ohmic contact 115 may be provided in the same manner as the contact 84 (FIG. 7).

The radiation sources 90 and 100 may have p-n junctions obtained by diffusion instead of p-n junctions obtained by a fusing process.

In the embodiment described with reference to FIG. 7 the semiconductor bodies 106, 80 and 99 consist of gallium phosphide. It will be appreciated that in principle these semiconductor bodies 106, 80 and 99 may be combined to form a single gallium phosphide body. This provides a construction in which the injection recombination radiation sources 100 and 90 and the photo-sensitive semiconductor body 80 have a common semiconductor body.

Such a structure may be obtained, for example, by growing from the vapour phase several layers of gallium phosphide doped with the desired impurities on a gallium phosphide support so that a gallium phosphide body is obtained which has three p-n junctions, the two outer junctions when biased in the forward direction providing the desired recombination radiation, while the intermediate p-n junction may serve as the photo-sensitive p-n junction. Obviously the manufacturing process may be one of various combinations of known epitaxial methods, diffusion methods and alloying methods.

The radiation 101 (FIG. 7) which reduces the photo-effect in the photo-sensitive semiconductor body 80 has a wavelength which corresponds to a quantum energy smaller than the width of the forbidden band in this photo-sensitive semiconductor body 80. The radiation 101 may have a quantum energy between about 0.6 electron-volt and about 2.0 electron volts, the width of the forbidden band in the gallium phosphide body 80 being about 2.25 electron-volts. As stated hereinbefore, this improves the energy gain of the circuit element, especially if this radiation 29 is produced by means of an injection recombination radiation source which comprises a semiconductor body in which the width of the forbidden band is smaller than in the photo-sensitive semiconductor body. This is not the case in the embodiment described with reference to FIG. 7. However, in FIG. 7 the injection recombination radiation source 100 may be replaced by the injection recombination radiation source 10 of FIG. 2 comprising a gallium arsenide body. The radiation source 10 emits radiation which has wavelength of about 9100 A.U. and also is capable of reducing the photo-effect in a copper-doped gallium-phosphide body by quenching. In this case also, the two radiation sources and the photo-sensitive semiconductor body may have a common semiconductor body. For example, a gallium arsenide body may be provided on a gallium phosphide body, as described hereinbefore with reference to FIG. 6. Furthermore the injection recombination radiation source 100 may have a semiconductor body of indium phosphide by means of which recombination radiation having a wavelength of about 9100 A.U. is also obtainable.

In the manufacture of the photo-sensitive semiconductor body 80 impurities and/or semi-conductor materials other than those mentioned may be used provided that they enable the desired effects to be produced. The radiation sources must be made to match the photo-sensitive semiconductor body used.

As stated hereinbefore, it would appear that the photo-sensitive semiconductor body must satisfy the following conditions and that the reduction of the photo-current can be explained in the following manner.

Figure 10:
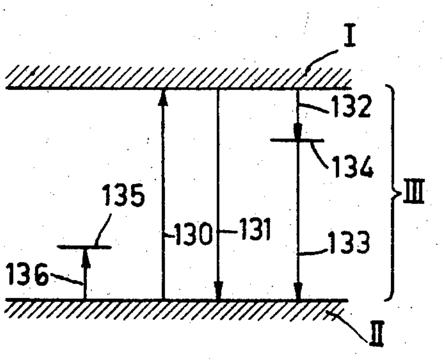
FIG. 10 is an energy diagram of a photo-sensitive semiconductor body for use in the circuit elements shown in FIG. 7.

The p-type part of the photo-sensitive semiconductor body adjacent the p-n junction must consist of a semiconductor material in which free charge carriers including minority carriers (electrons) can be generated by means of one of the radiation sources, for example, in that radiation from this radiation source induces transitions 130 (FIG. 10) in which electrons are brought from the valence band II to the conduction band I. The quantum energy of the radiation must at least be equal to the width of the forbidden band III. The lifetime of the resulting minority carriers (electrons) depends upon the recombination of electrons with holes. The recombination of electrons with holes may take place by band-to-band transitions 131 and/or by transitions 132 and 133 by way of an intermediate level 134 produced by a recombination centre (killer). Since recombination centres cannot readily be avoided, they are generally present in the semiconductor material but they may, if desired, be intentionally incorporated in the semiconductor material, for example, in the form of crystal defects.

The semiconductor material further must contain an acceptor level 135 which substantially does not influence the recombination (in the embodiment comprising a gallium phosphide body (FIG. 7) this level is produced by copper). Transition of electrons from the conduction band I by way of this acceptor level 135 to the valence band II are slow so that this acceptor level 135 has substantially no influence on the recombination.

The Fermi level lies between the acceptor level 135 and the valence band II so that the level 135 at least partly is not occupied by electrons and electrons can be brought from the valence band II to the level 135 by means of transitions 136 by radiation which is emitted by the other radiation source and has a quantum energy at least equal to the spacing between the level 135 and the valence band II. As a result, holes are produced in the valence band II so that the concentration of holes in the valence band II is increased. This promotes the recombination of electrons with holes and consequently reduces the lifetime of the electrons (minority carriers) in the conduction band I. Since the photo-current produced in a semiconductor body which contains a p-n junction is strongly dependent upon the lifetime of the minority carriers, the photo-current also is reduced.

It should be noted that the generation of free-charge carriers including minority carriers need not necessarily take place through band-to-band transitions but may also take place in two transition steps by way of a further intermediate energy level in the forbidden band.

As stated hereinbefore, there may be interposed between the radiation source 200 optically coupled to the photo-sensitive semiconductor body 202 (FIG. 1) and this photo-sensitive semiconductor body 202 a filter 206 of semiconductor material, the transmission of the filter 206 for the radiation 207 from the radiation source 200 being controllable by means of the radiation source 204 which is optically coupled to the filter 206 and emits radiation 211.

The filter 206 may consist of high-resistance gallium phosphide doped with zinc and oxygen so that an intermediate level 50 (FIG. 3) is produced in the forbidden band of the filter. The radiation source 200 may emit, for example, radiation 207 which has a wavelength of about 7000 A.U. and is capable of causing the larger transition step 52 (FIG. 3). The radiation source 200 may be, for example, the radiation source 20 shown in FIG. 2.

The radiation 207 will be partially absorbed in the filter 206. As discussed hereinbefore with reference to the photosensitive semiconductor body 1 (FIG. 2) this absorption may be increased by means of radiation capable only of causing the smaller transition step 51 (FIG. 3). The radiation source 204 used may be the radiation source 10 of FIG. 2 which emits such radiation. In this case, the radiation 211 is capable of causing the smaller transition step only and in this manner by applying electric input signals to the electric input 205 the absorption of the radiation 207 in the filter 206 and hence the part of the radiation 207 reaching the photo-sensitive semiconductor body 202 can be controlled. The electric output signal may be taken from the electric output 203.

If the filter 206, which fundamentally is also a photo-sensitive semiconductor body, is provided with contacts, a second electric output is obtained.

The photo-sensitive semiconductor body 202 may form part of any photo-detector responsive to the radiation 207 and may advantageously be a photo-voltaic cell.

At least two of the components comprising the radiation sources 200 and 204, the filter 206 and the photo-sensitive semiconductor body 202 may have a common semiconductor body. This permits a highly compact construction.

Materials other than those mentioned may be used. The filter 206, for example, may consist of n-type gallium phosphide which is also doped with zinc and oxygen and in which the intermediate level 50 (FIG. 3) is occupied substantially entirely by electrons. If the radiation sources 200 and 204 are interchanged, in principle the radiation 207 can cause only the smaller transition step 51 (FIG. 3) and the radiation 211 the larger transition step 52 (FIG. 3). In this case the radiation 207 is substantially not absorbed in the filter 206, since no electrons can be brought from the valence band to the already occupied intermediate level 50. When the radiation 211 reaches the filter electrons are brought from the intermediate level 50 into the conduction band and in this event the radiation 207 can be absorbed, since electrons can be brought from the valence band to the vacancies in the intermediate level 50. In this case the photo-sensitive semiconductor body 202 is required to detect radiation capable only of causing the smaller transition step 51.

It will be appreciated that the invention is not restricted to the embodiments described and that many variations are possible to a person skilled in the art without departing from the scope of the invention. For example, semiconductor surfaces through which radiation leaves or enters a semiconductor body may be provided with the anti-reflection layers commonly used in optics. Furthermore conductor materials and/or impurities other than those described may be used. The p–n junction 16 produced in the gallium arsenide body 11 by fusing the contact 12 (FIG. 2) to this body may alternatively be obtained, for example, by diffusion of zinc at about 900° C., and the resulting p-type diffusion zone and the n-type remainder of the body 11 may be provided with substantially ohmic contacts. To the p-type diffusion zone such an ohmic contact may be made by fusing onto it, for example, an amount of indium which contains about 3% by weight of zinc.

The discussed embodiments of opto-electronic circuit elements according to the invention comprise a radiation source which in the photo-sensitive semiconductor body produces a photo-effect and a radiation source by means of which this photo-effect can be optically influenced. There may, however, be several radiation sources capable of producing a photo-effect in the photo-sensitive semiconductor body and several radiation sources capable of influencing this photo-effect. Circuit elements according to the invention may be used to advantage not only for amplifying electric signals but also in logical circuit arrangements. In addition, an injection recombination radiation source used may function as an injection recombination laser.

What is claimed is:

1. An opto-electronic electric circuit element comprising:

(a) a photosensitive semiconductor body and a pair of electrodes coupled to said photosensitive body, (b) an output circuit including means for establishing a potential across said electrodes whereby the current flow in said output circuit depends upon the irradiation of said body, (c) a first voltage-responsive radiation source optically coupled to said photosensitive body and including a first input circuit for applying a first signal voltage to said radiation source to cause radiation having a first energy content to be generated thereby to irradiate said photosensitive body.

(d) and a second voltage-responsive radiation source also optically coupled to said photosensitive body and includnig a second input circuit for applying a second signal voltage to said second radiation source to cause radiation having a second energy content to be generated thereby also to irradiate said photosensitive body.

(e) said photosensitive semiconductor being of a material having a forbidden gap between its valence and conduction bands and possessing a deep-lying impurity level in the forbidden gap defining a first transition step between the valence band and the impurity level and a second transition step between the impurity level and the conduction band, the radiation generated by said first radiation source having an energy content capable of causing the first transition step, the radiation generated by said second radiation source having an energy content capable of causing the second transition step, whereby the current flow in the output circuit depends upon electrons brought from the valence to the conduction band by two optically-excited transitions, one produced by the first radiation source in response to the first signal and the other produced by the second radiation source in response to the second signal.

2. An opto-electronic electric circuit element as set forth in claim 1 wherein the impurity level is spaced by at least 0.1 electron-volt from both the valence and conduction bands, the first transition step is smaller than the second transition step, and the principal energy content of the radiation from said one source is greater than said first transition step but smaller than said second transition step and is thus capable of causing only the first transition step.

3. An opto-electronic electric circuit element as set forth in claim 2 wherein the photosensitive semiconductor body contains a p-n junction and is constituted of gallium phosphide doped with zinc and oxygen, and the radiation sources are injection recombination radiation sources.

4. An opto-electronic electric circuit element comprising:

(a) a photosensitive semiconductor body and a pair of electrodes coupled to said photosensitive body, (b) an output circuit including means for establishing a potential across said electrodes whereby the current flow in said output circuit depends upon the irradiation of said body, (c) a first voltage-responsive radiation source optically coupled to said photosensitive body and including a first input circuit for applying a first signal voltage to said radiation source to cause radiation having a first energy content to be generated thereby to irradiate said photosensitive body, (d) and a second voltage-responsive radiation source also optically coupled to said photosensitive body and including a second input circuit for applying a second signal voltage to said second radiation source to cause radiation having a second energy content to be generated thereby also to irradiate said photosensitive body, (e) said photosensitive semiconductor being of a material having a forbidden gap between its valence and conduction bands and possessing an acceptor level in the forbidden gap, the Fermi level being located between the acceptor level and the valence band, the radiation generated by said first radiation source having an energy content capable of generating free charge carriers including minority carriers whose lifetime depends upon recombination of electrons with holes, the radiation generated by said second radiation source having an energy content capable of bringing electrons from the valence band to the acceptor level thereby increasing the hole concentration in the valence band and reducing the lifetime of the free charge carriers, whereby the current flow in the output circuit depends upon electrons brought from the valence to the conduction band by at least one optically-excited transition in response to the first signal and whose recombination is promoted by another optically-excited transition in response to the second signal.

5. An opto-electronic electric circuit element as set forth in claim 4 wherein the photosensitive body is of gallium phosphide doped with copper to produce the acceptor level, the energy content of the radiation from said second source being at least equal to about 0.57 electron-volt, and the radiation sources are injection recombination radiation sources.

6. An opto-electronic electric circuit element comprising:

(a) a photosensitive semiconductor body and a pair of electrodes coupled to said photosensitive body, (b) an output circuit including means for establishing a potential across said electrodes whereby the current flow in said output circuit depends upon the irradiation of said body, (c) a first voltage-responsive radiation source optically coupled to said photosensitive body and including a first input circuit for applying a first signal voltage to said radiation source to cause radiation having a first energy content to be generated thereby to irradiate said photosensitive body, (d) a filter of semiconductor material disposed in the optical path between the first radiation source and the photosensitive body, (e) and a second voltage-responsive radiation source optically coupled to said filter and including a second input circuit for applying a second signal voltage to said second radiation source to cause radiation having a second energy content to be generated thereby to irradiate said filter, (f) said photosensitive semiconductor being of a material generating a voltage or whose conductivity increases when irradiated by said first source, said filter being of a material having a forbidden gap between its valence and conduction bands and possessing a deep-lying impurity level in the forbidden gap defining a first transition step between the valence band and the impurity level and a second transition step between the impurity level and the conduction band, the radiation generated by said first radiation source having an energy content capable of causing one of the first and second transition steps, the radiation generated by said second radiation source having an energy content capable of causing the other of the first and second transition steps, whereby the current flow in the output circuit depends upon radiation from the first source attenuated by the filter by electrons brought from the valence to the conduction band by two optically-excited transitions, one produced by the first radiation source in response to the first signal and the other produced by the second radiation source in response to the second signal.

7. An opto-electronic electric circuit element as set forth in claim 4 wherein the photosensitive body comprises adjacent p and n regions forming a p-n junction, and the first radiation source is optically coupled to the p region of the photosensitive body.

References Cited

UNITED STATES PATENTS

| | | | |
|---|---|---|---|
| 3,070,898 | 12/1962 | Bloembergen | 250—833 |
| 3,171,031 | 2/1965 | Yariv | 250—199 |
| 3,229,104 | 1/1966 | Rutz | 250—211 |
| 3,304,430 | 2/1967 | Braid et al. | 250—211 |

RALPH G. NILSON, *Primary Examiner.*

MARTIN ABRAMSON, *Assistant Examiner.*

U.S. Cl. X.R.

250—217; 317—235